United States Patent

[11] 3,628,607

[72] Inventor Daniel N. Dietz
 Rijswijk, Netherlands
[21] Appl. No. 35,449
[22] Filed May 7, 1970
[45] Patented Dec. 21, 1971
[73] Assignee Shell Oil Company
 New York, N.Y.
[32] Priority May 12, 1969
[33] Great Britain
[31] 24026/69

[54] OIL SPILL REMOVAL METHOD
3 Claims, 3 Drawing Figs.
[52] U.S. Cl. ................................................. 166/305 R,
 166/314, 166/52, 166/305
[51] Int. Cl. ................................................... E21b 43/16
[50] Field of Search .......................................... 166/314,
 305 R, 268, 265, 52; 210/83, 84; 61/1 R, 1 F

[56] References Cited
UNITED STATES PATENTS

| | | | |
|---|---|---|---|
| 546,126 | 9/1865 | Titus | 166/268 |
| 634,015 | 10/1899 | Moran | 166/52 |
| 842,696 | 1/1907 | Pfeiffer, Jr. | 166/52 |
| 1,286,666 | 12/1918 | Layne | 166/268 |
| 1,342,679 | 6/1920 | Howell | 166/52 |
| 2,607,426 | 8/1952 | Rose | 166/306 |
| 3,195,633 | 7/1965 | Jacob | 166/306 |
| 3,199,592 | 8/1965 | Jacob | 166/306 |
| 3,202,215 | 8/1965 | Stanonis | 166/248 X |
| 3,342,135 | 9/1967 | Schnabel, Jr. | 166/52 X |

Primary Examiner—Stephen J. Novosad
Attorneys—Harold L. Denkler and J. H. McCarthy ABSTRACT: Taste-spoiling components of oil spilled in a drinking water catchment area are removed from the aquifer by supplying liquid such as water or tasteless oil to the spill area and recovering the liquid together with the undesired components via an auxiliary well.

INVENTOR:
D. N. DIETZ
BY:
HIS ATTORNEY

OIL SPILL REMOVAL METHOD

Background of the Invention

1. Field of the Invention

The invention relates to a method of recovering ground water from a catchment area of potable water. In particular, the present invention relates to the recovery of potable water from ground water in a catchment area where accidental spillage of hydrocarbon liquids has occurred, which hydrocarbon liquids comprise components that would spoil the taste of drinking water if dissolved therein.

2. Description of the Prior Art

Aquifers in danger of pollution are those that are not covered by an impervious or semipermeable layer such as a shale layer. The water in the aquifer is confined at the top thereof by a capillary zone, in which only the smaller pores of the soil are filled with water. Rainwater will percolate through the permeable layer overlying the aquifer and thus replenish the water volume present in the aquifer. In a catchment area the water in the aquifer will move towards collecting systems such as wells, drainpipes or open channels which have been installed to collect the water.

If oil is spilt at the surface, it will move downwards in a fairly narrow funnel. Being lighter than water, the oil will have little tendency to penetrate into the body of water present in the aquifer but will rather spread on top of this body of water and continue to spread until it is distributed in isolated or almost isolated oil clots that are retained by capillary forces. Thus, there is a limit to which the oil can spread by free flow, and only in the case of an exceptionally large spillage very close to the collecting system is it to be feared that the oil may flow bodily into the water-collecting system.

The more common danger lies in the presence of a "pancake" of immobile oil on top of the body of the water, which oil is retained in the pore space of the aquifer by capillary forces. Rainwater will percolate through this pancake of finely dispersed oil on its downward path towards the body of water. The water-soluble components which spoil the taste of the water will then dissolve in the rainwater. This rainwater will mix with other, unpolluted water, and eventually reach the collecting system. As even a small amount (one part per million) of these oil components will make the taste of water unacceptable when dissolved in the water, measures should be taken to prevent such a situation from developing.

It has already been proposed to drill at least one auxiliary well in the spillage area. Water is then pumped from such auxiliary well and a new sink is formed in the underground fluid distribution. If the auxiliary well is in operation before the oil is fully spread (i.e. while it is still mobile), part of the oil may be removed bodily from the aquifer. Unavoidably, however, a pancake of immobile oil will remain in the aquifer and pollute the rainwater that percolates through it. The auxiliary well or wells should therefore be kept in operation in order to cause such a redistribution of the ground water flow that all the water that has passed through the pancake is collected in the auxiliary well(s), whereafter it is disposed of. The rates required to bring this about are often so low that an intermittent operation of the well(s) may suffice. Eventually all the objectionable components of the oil in the pancake will be removed from the aquifer after sufficient rainwater has passed through. Depending on the type of oil and on local conditions, it may take years before the operation of the auxiliary well(s) can safely be discontinued.

SUMMARY OF THE INVENTION

The object of the invention is to improve the above-mentioned method in such a manner that the auxiliary well(s) need(s) to be operated over a limited period of time only.

This is brought about by removing at least the objectionable components of the hydrocarbon liquids that have been spilt in the region from which potable water is recovered, by transporting a liquid to the surface of the soil at the location where the hydrocarbon liquids have been spilt and supplying this liquid to the surface at said location.

In one version of the invention the immobile oil in the pancake is remobilized and displaced from the aquifer by supplying additional oil to the location where the oil has originally been spilt. It is recommended to use an amount of additional oil which is somewhat larger than the amount of originally spilt oil that has remained in the aquifer. The additional oil should be of a type that is completely miscible with the one originally spilt and it should be slightly more viscous. It should moreover be free from objectionable components. A paraffinic oil, such as medicinal oil, will be suitable. It is known from the production techniques wherein crude oil is recovered from subsurface oil-containing layers, that under these conditions the oil originally present in the formation will be effectively displaced. The originally spilt oil can thus be collected via the auxiliary well(s) and disposed of. At the end of the operation, a pancake of immobile oil remains, but this consists of the additional oil, which is free from objectionable components.

In another version of the invention the procedure as presently known is left essentially unaltered but is artificially speeded up. In the known procedure one may have to spend a long time waiting for sufficient rain water to percolate through the oil-pancake for the objectionable components in the oil to become exhausted. The process can, however, be completed in a relatively short time provided that a sufficiently large volume of water is made to percolate through the pancake in that period of time. This can be brought about by transporting water to the spillage area, applying known methods of irrigation in the area over the pancake and pumping the auxiliary well(s) at a correspondingly high rate.

DESCRIPTION OF PREFERRED EMBODIMENTS

Figure 1:
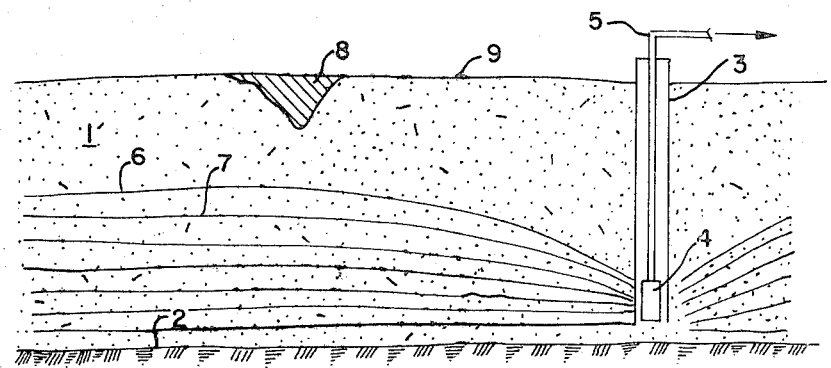
FIG. 1 shows a cross section of a water catchment area traversed by a well used for the recovery of potable water in which area hydrocarbon liquids have been spilt on the earth.
Figure 2:
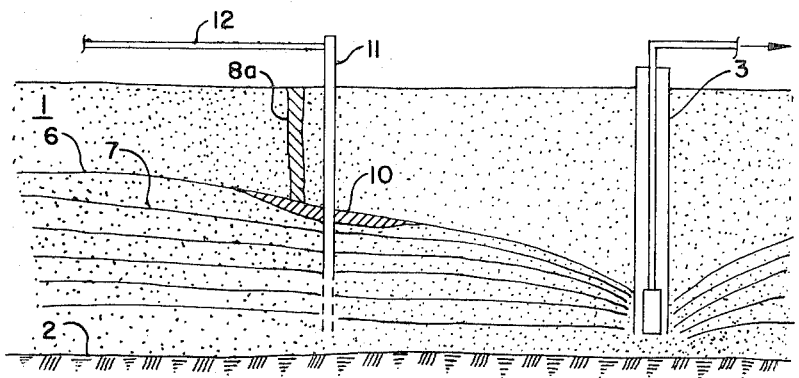
FIG. 2 shows the catchment area of FIG. 1 traversed by an auxiliary well which may be used in the practice of this invention.

Referring to the FIGS. we see an aquifer 1 overlying an impermeable layer 2, such as a clay layer. Water is present in the pore space of the aquifer 1, and recovered via a well 3 penetrating the aquifer 1. Suitable tubular equipment is arranged in the well for recovering the water. This equipment includes a pump 4 which transports the water from the bottom of the well to the earth's surface via a tubing 5. The further equipment as used in the well 3 is not shown in detail, since it is known per se and is not of particular interest in the present method. As can be seen from FIG. 1, the surface 6 of the body of water present in the aquifer 1 is curved towards the well 3, which withdraws water from the aquifer. The flow lines 7 indicate the flow of water from the various parts of the aquifer 1 towards the well 3.

At some distance from the well 3 an amount of oil 8 has been spilt on the earth's surface 9. This amount of oil 8 flows downwards through the subsoil 1 (see area 8a) until it contacts the water level 6 and spreads over the water surface until it is distributed in isolated or almost isolated clots and forms a pancake 10, which is rendered immobile by capillary forces.

Figure 3:
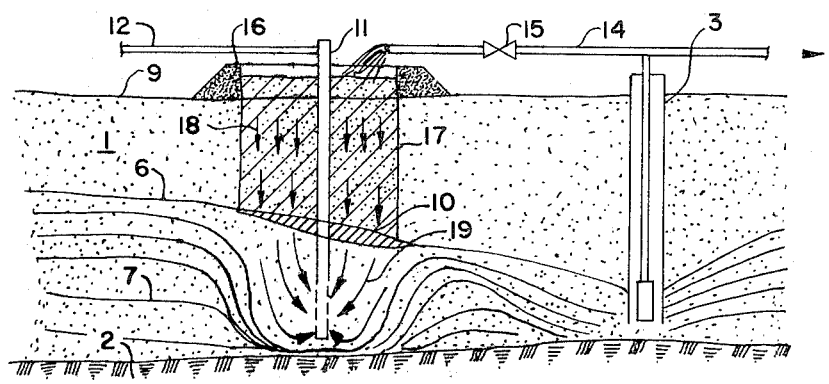
FIG. 3 shows the auxiliary well in operation according to the teachings of this invention.

To remove the objectionable components of the oil forming the pancake 10, a well 11 is drilled in the aquifer 1 to a level below the water surface 6. This well 11 is equipped with a pump (not shown) which, when in operation, can transport liquid from the bottom of the well 11 to the surface of the earth. This liquid is guided away from the well 11 by a conduit 12. Withdrawal of water from the region near the bottom of the well 11 causes a sink (not shown) to form in the water surface 6. At the same time, or thereafter, water not contaminated with oil is transported to the area around the auxiliary well 11 and supplied to this area. This water may be supplied by the well 3 via a conduit 14 provided with a valve 15. The water is prevented from spreading over undesired parts of the surface 9 by a small dike 16. By so choosing the area over which the water is supplied to the surface 9 that it is somewhat larger than the area of the pancake 10, the pancake 10 will be washed by the water, which, as can be seen from FIG. 3 flows downwards through the region 17 (as shown by arrows 18), thereby removing the objectionable components such as mercaptans and phenols from the oil forming the pancake 10. At the same time the objectionable components of the crude oil particles that have been retained in the area 8a of the aquifer 1 during the downward travel of the oil are washed from this oil. The water containing the objectionable components is removed from the subsoil 1 via the auxiliary well 11. The flow lines 19 indicate the flow of this contaminated water.

With the arrangement as shown in the drawing and the steps as described hereinabove, the water as recovered via the well 3 will not be contaminated and will remain potable. The water contaminated with objectionable components from the oil is removed from the aquifer 1 via the auxiliary well 11. The water as removed via this well is periodically tested for potability. If drinkable again, this means that objectionable components have been removed from the aquifer 1, and that the well 11 can be put out of operation. It will be appreciated that at the same time the supply of water via the conduit 14 is stopped. By the above-described method, the period over which the well 11 should be kept operating is shortened to a considerable extent as compared with the prior art method.

It will be appreciated that the present invention is not restricted to the use of water for washing the objectionable oil components from the pore space of the aquifer 1.

With similar results, other washing liquids may be applied, such as paraffinic oil. This oil will displace the total amount of oil (including the objectionable components thereof) towards the well 11, from where it is removed by the action of the pump (not shown) arranged in the well 11. Although paraffinic oil particles now remain caught in the pore space, these particles do not form a problem since they do not contain taste-spoiling components. It is recommended to apply a volume of this additional oil that is somewhat larger than the volume of the oil originally spilt which has formed the pancake 10.

It will be understood that if the auxiliary well 11 is drilled very quickly after the oil 8 has been spilt, part of this oil may be pumped away via this well 11 before this oil has formed an immobile pancake 10 by spreading over the water level 6.

It will further be understood that the method according to the invention can also be applied in areas where more than one auxiliary well is drilled for removing from the aquifer the water contaminated by oil or other hydrocarbon liquid. Further, the present method may be applied in areas where more than one main well or another collecting system is used for the recovery of uncontaminated water.

It will further be clear that the method according to the invention is not restricted to the removal of hydrocarbon liquids that have been accidentally spilt on the surface of the earth, but may with equal result be applied to remove hydrocarbon liquids that have leaked from reservoirs or pipelines.

I claim as my invention:

1. A method for recovering taste-spoiling components of a hydrocarbon liquid that has percolated into a subsurface drinking water aquifer overlaid by permeable formations through which liquids may percolate from the earth surface into said aquifer, the method comprising:

providing a well which traverses that portion of the aquifer into which said hydrocarbon liquid has percolated;

transporting a washing liquid to the surface of the earth above that portion of the aquifer into which said hydrocarbon liquid has percolated;

supplying said washing liquid to the surface of the earth above that portion of the aquifer into which said hydrocarbon liquid has percolated whereby said washing liquid percolates through said permeable formations and through the portion of the aquifer into which said hydrocarbon liquid has percolated thereby washing said taste-spoiling components from said portion of the aquifer; and recovering said washing liquid and said taste-spoiling components through said well.

2. The method of claim 1 wherein the washing liquid supplied to the surface of the soil is water.

3. The method of claim 1 wherein the washing liquid supplied to the soil is a paraffinic oil.

* * * * *